United States Patent Office 3,454,593
Patented July 8, 1969

1

3,454,593
PROCESS FOR PREPARING 1-AROYL-3-INDOLYL ACETIC ACIDS
George Gal, Summit, and Meyer Sletzinger, North Plainfield, N.J., assignors to Merck & Co., Inc., Rahway, N.J., a corporation of New Jersey
No Drawing. Filed July 14, 1965, Ser. No. 472,041
Int. Cl. C07d 27/56; A61k 27/00
U.S. Cl. 260—326.12                                      10 Claims

ABSTRACT OF THE DISCLOSURE

This invention relates to the preparation of (1-acylated-2-methyl-3-indolyl) lower aliphatic acids by acidolysis of various esters of such compounds.

The process of this invention is broadly applicable to the preparation of α-(1-acylated-2-methyl-3-indolyl) lower aliphatic acids including substituted derivatives thereof by acidolysis of selected alkyl esters including phthalimidomethyl esters of such componds. The term substituted as used herein carries a very broad implication and includes substituents on the acyl moiety as well as the benzenoid portion of the indole ring and the side chain at the 3-position of the said ring. Such substituents may be selected from a very broad class of substituents with the proviso that unless they can be chemically protected, they must be inert to the reagents employed.

The following formula, while not intended to limit the invention to the products illustrated, is exemplary of compounds which can be prepared by the process of this invention.

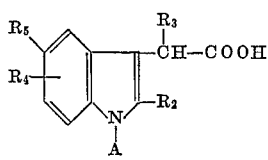

wherein $R_2$ is hydrogen, or a hydrocarbon radical having less than nine carbon atoms, including, for example, lower alkyl, lower alkenyl, cycloalkyl, aryl, alkaryl and aralkyl radicals; $R_3$ is hydrogen, lower alkyl or lower alkenyl; $R_4$ is hydrogen, halogen, or a lower alkyl or lower alkoxy radicals; $R_5$ is hydrogen, lower alkyl, lower alkoxy, nitro, cyano, haloalkyl, halogen, hydroxyl, mercapto, benzylmercapto, substituted benzyl-mercapto, benzyloxy, substituted benzyloxy, dialkylsulfonamido, cyclic lower alkyl, and cyclic lower alkyl lower alkoxy; and A is an aroyl, substituted aroyl, heteroaroyl or substituted heteroaroyl radical containing less than 3 fused rings.

Typical representations of the class are (1-p-chlorobenzoyl-2-methyl-5-methoxy-3-indolyl) acetic acid, α-(1-p-methylthiobenzoyl-2-methyl-5-chloro-3-indolyl) propionic acid and (1-p-chlorobenzoyl-2-methyl-5-ethyl-3-indolyl) acetic acid. They have a high degree of anti-inflammatory activity and are known to be effective and useful in the prevention and inhibition of granuloma tissue formation. They are also of value in the treatment of arthritic and dermatological disorders and like conditions responsive to treatment with anti-inflammatory agents.

In one convenient method for the preparation of the starting material used in the herein disclosed invention, a phenylhydrazine or substituted phenylhydrazine is reacted with a levulinic acid ester or a substituted levulinic compound in a lower alkanol or a non-polar solvent such as benzene under acid conditions. The reaction may be illus-

2 trated by the following reactional sequence, showing the preparation of methyl 2-methyl-5-methoxy-3-indolyl acetate:

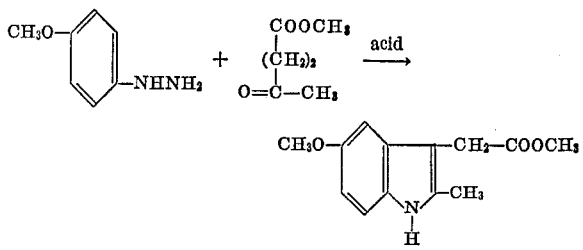

The corresponding acid is similarly prepared utilizing levulinic acid in place of the methyl ester and the compounds with radicals other than methyl on the 2-position and hydrogen on the 3-carbon are similarly prepared by utilizing an appropriately substituted levulinic-type compound in the cyclization reaction.

It has been observed that when strongly electronegative groups such as the nitro radical are substituted on the phenylhydrazine reactant (e.g., p-nitrophenylhydrazine), the cyclization reaction shown above is most advantageously accomplished using the acid reactant, since complications may result if acid-sensitive groups introduced by tertiary alkanols or the phthalimidomethyl radical are present.

In the next step for the preparation of the therapeutic agents illustrated above, the thus-prepared indolyl compounds are acylated at the 1-position. This reaction is normally effected by treating the indolyl compound with a metal hydride such as sodium hydride and thereafter with an aroyl or heteroaroyl halide in a reaction inert organic solvent such as benzene, toluene, xylene or dimethylformamide. Although the acylation is applicable to acids and esters of the indole series illustrated above, it is preferred to acylate esters rather than acids since acids are more susceptible to side reactions, thus leading to decreased yields and compounding the difficulties of purification. The indolyl acids prepared above are preferably converted to esters then, in the manner well-known in the art.

A problem associated with the acylation of esters arises when the ultimate compound sought is not the ester being acylated but the free acid, another ester, or some other derivative which may be of special value, for instance more soluble in the carrier, more stable or more efficiently absorbed when the compound is employed therapeutically. The problem is that hydrolysis of the original ester to prepare the acid for use either as a final product or as an intermediate, is complicated by a concurrent hydrolysis of the 1-acyl group. Accordingly, any method by which the ester can be hydrolyzed without such side reaction is of great value. This invention provides such a method.

In accordance with this invention it has been discovered that certain selected esters, suitable lower alkyl esters such as methyl, ethyl, propyl, and butyl esters and the phthalimidomethyl ester of the 1-acylated-3-indolyl aliphatic acids described above can be cleaved under controlled acid conditions while leaving the 1-acyl group substantially unaffected.

Primary and secondary alkyl esters are cleaved by acidolysis in accordance with this invention by treatment, at an elevated temperature, in a lower alkanoic acid, which is liquid at room temperature, such as formic or acetic acid, with a lower alkane sulfonic acid. Methanesulfonic acid is preferred, because it is readily obtainable and affords good yields. Reaction is generally effected by taking up the ester in the selected alkanoic acid containing an equimolar quantity of sulfonic acid and heating at a temperature of from about 90° C. to about 130° C., for a period of from about 2 to about 8 hours. For practical reasons, it is preferred to simply reflux the reaction mixture at its boiling point, under atmospheric conditions. Although 100% acid can be used, 90% by weight acids are preferably employed.

The product can be isolated in any convenient manner. Most products are insoluble in dilute acid so that they are conveniently isolated by diluting the reaction mixture with water to cause precipitation.

Tertiary alkyl and phthalimidomethyl esters are cleaved by the process of this invention by means of hydrogen chloride. The acylated ester is preferably dissolved in a reaction inert solvent, suitably benzene or toluene, at temperatures from about 0° C. to about 30° C., for about 15 hours to about 30 hours. The preferable method calls for the ester solution to be saturated with the gaseous reagent. After the reaction is complete, the precipitate, a 1-acylated-2-methyl-3-indolyl lower aliphatic acid is separated from the reaction mixture and purified in any convenient manner.

The acids produced by the process of this invention may be used directly or may be converted by known methods to other useful compounds.

The preparation of representative starting compounds which can be used in this invention is shown below.

PREPARATION OF STARTING COMPOUNDS

PREPARATION 1

Phthalimidomethyl-(2-methyl-5-methoxy-3-indolyl) acetate (A) Phthalimidomethyl levulinate. — Levulinic acid (0.1 mole) is dissolved in 30 ml. of ethyl acetate. Triethylamine (0.1 mole) and 0.1 mole of N-chloromethylphthalimide are added and the mixture is stirred for 24 hours at 40° C. The insoluble triethylamine hydrochloride is filtered off and the solvent evaporated in vacuo to produce phthalimidomethyl levulinate.

When an α-alkyl-substituted levulinic acid is used in place of levulinic acid, the corresponding α-substituted phthalimidomethyl levulinate is produced, for example, phthalimidomethyl α-methyl levulinate. And when 3-benzoyl propionic acid and similar compounds are utilized in place of levulinic acid, the corresponding γ-substituted esters are produced.

(B) Phthalimidomethyl-(2-methyl-5-methoxy-3-indolyl) acetate

A total of 0.1 mole of p-methoxyphenylhydrazine hydrochloride and 0.1 mole of the product of Part A are added to 200 ml. of benzene. The mixture is heated to reflux, under nitrogen, with stirring, for 7 hours. The precipiated ammonium chloride is filtered off and the filtrate washed thrice with 50 ml. portions of water. The benzene solution is then dried over magnesium sulfate, concentrated to 50 ml. in vacuo and 100 ml. of hexane added. After 2 hours at 10° C. the precipitate, phthalimidomethyl-(2-methyl-5-methoxy-3-indolyl) acetate is filtered off, washed with hexane and dried in vacuo at 50° C.

Similarly, by utilizing the procedure of this part with substituted phenylhydrazines other than p-methoxyphenylhydrazine hydrochloride, the following esters are prepared:

phthalimidomethyl-(2-ethyl-5-isopropoxy-3-indolyl) acetate;
phthalimidomethyl-(2-phenyl-5-hydroxy-3-indolyl) acetate;
phthalimidomethyl-(2,5-dimethyl-3-indolyl) acetate;
phthalimidomethyl-α-(2-n-propyl-5-cyclobutyl-3-indolyl) propionate;
phthalimidomethyl-α-(2-isobutyl-5-ethoxy-3-indolyl)-n-butyrate;
phthalimidomethyl-α-(2-n-butyl-5-benzyloxy-3-indolyl)-α-isopropyl acetate;
phthalimidomethyl-α-(2-methyl-5-cyclopropyl-3-indolyl) n-hexanoate;
phthalimidomethyl-α-(2-cyclopropyl-5-benzylmercapto-3-indolyl)n-pentanoate;

(C) When 0.1 mole of the product of Part A is mixed with 0.1 mole of 3-methoxyphenylhydrazine according to the procedure of Part B, the two isomers which are obtained, phthalimidomethyl - (2-methyl-4-methoxy-3-indolyl) acetate and phthalimidomethyl-(2-methyl-6-methoxy-3-indolyl) acetate, may be separated by chromatography.

When an equivalent amount of 3-methyl-4-methoxyphenylhydrazine or 3-methoxy-4-ethylphenylhydrazine is employed in this procedure in place of 3-methoxyphenylhydrazine both isomers of each are obtained, namely;

phthalimidomethyl-(2,4-dimethyl-5-methoxy-3-indolyl) acetate;
phthalimidomethyl-(2,6-dimethyl-5-methoxy-3-indolyl) acetate;
phthalimidomethyl-2-methyl-4-methoxy-5-ethyl-3-indolyl acetate;
phthalimidomethyl-2-methyl-5-ethyl-6-methoxy-3-indolyl acetate.

PREPARATION 2

Preparation of Additional Esters

Phthalimidomethyl-(2-methyl-5-nitro-3-indolyl) acetate (A) 2-methyl-5-nitro-3-indolyl acetic acid.—A solution of 0.05 mole of levulinic acid in 50 ml. of hot water is added to a solution of 0.04 mole of p-nitrophenylhydrazine hydrochloride in 100 ml. of hot water containing 0.05 mole of sodium acetate, with stirring. After one-half hour, the hydrazone derivative is filtered, washed with water and dried at 110° C., in vacuo. A solution of 20 g. of fused zinc chloride in 20 ml. of absolute ethanol is added and the mixture refluxed for 18 hours. The cooled solution is poured into dilute hydrochloric acid, with stirring, and the insoluble material which separates is extracted with ether. The ether solution is extracted several times with 10% sodium carbonate and acidification of the latter gives 2-methyl-5-nitro-3-indolyl acetic acid.

In like manner, the following compounds are prepared:

α-(2-ethyl-5-fluoro-3-indolyl) propionic acid;
α-(2-isopropyl-5-trifluoromethyl-3-indolyl)butyric acid.

(B) Phthalimidomethyl-(2-methyl-5-nitro - 3 - indolyl) acetate.—2 - methyl - 5 - nitro-3-indolyl acetic acid (0.01 mole) is slurried in 25 ml. of dry ethyl acetate. Triethylamine (0.01 mole) is added and the mixture is stirred until solution occurs. N-chloromethyl-phthalimide (0.01 mole) is added and the reaction mixture left at 35° C. overnight. The precipitated triethylamine hydrochloride is filtered off and the solvent evaporated in vacuo, to produce phthalimidomethyl - (2-methyl-5-nitro-3-indolyl) acetate.

The other acids prepared in Part A of this example may be similarly esterified.

PREPARATION 3

Ethyl-(2-methyl-5-methoxy-3-indolyl) acetate (A) 2-methyl-5-methoxy-3-indolyl acetic acid.—This indole acid is prepared by the method of Preparation 2, Part A.

(B) Ethyl-(2-methyl-5-methoxy-3-indolyl) acetate.—A total of 0.1 mole of 2-methyl-5-methoxy-3-indolyl acetic acid is refluxed under nitrogen for six hours in 300 ml. of absolute ethanol containing 10 ml. of concentrated sulfuric acid. The ethanol is removed in vacuo, 500 ml. of ether added and the ether solution washed with water and then a saturated sodium bicarbonate solution. When the ether solution is removed in vacuo, the residue is ethyl-(2-methyl-5-methoxy-3-indolyl) acetate.

Similarly, when any other alkanol is used in place of ethanol in the above reaction, the corresponding ester of 2-methyl-5-methoxy-3-indolyl acetic acid is obtained.

PREPARATION 4

Phthalimidomethyl-[1-(p-chlorobenzoyl)-2-methyl-5-methoxy-3-indolyl] acetate

A solution of 0.02 mole of phthalimidomethyl-(2-methyl-5-methoxy-3-indolyl) acetate, prepared by the method of either Preparation 1 or 2, in 20 ml. of dimethylformamide, is added dropwise to a cold suspension of 1.0 g. (0.022 mole) of sodium hydride (52% dispension in mineral oil) and 25 ml. of dimethylformamide. The mixture is stirred at room temperature for 20 minutes, cooled and treated with 0.022 mole of p-chlorobenzoyl chloride. The reaction mixture is stirred at room temperature for about 16 hours and poured into 260 ml. of ice water. This aqueous mixture is extracted with three 250 ml. portions of ether, the ether extract washed with 100 ml. of potassium bicarbonate solution and three 100 ml. portions of water, dried and concentrated at reduced pressure to give phthalimidomethyl-[1-(p-chlorobenzoyl)-2-methyl-5-methoxy-3-indolyl] acetate.

In the same manner, using other acyl chlorides in place of p-chlorobenzoyl chloride, the following compounds are prepared:

methyl-α-(1-p-methylthiobenzoyl-2-methyl-5-fluoro-3-indolyl)-α-(t-butyl) acetate;
t-butyl-α-(1-p-phenoxybenzoyl-2-methyl-5-nitro-3-indolyl) propionate;
ethyl-α-(1-benzoyl-2-methyl-5-benzyloxy-3-indolyl)-α-(2-ethyl butyl) acetate;
isopropyl-α-[-(thiazole-4-carboxy)-2-methyl-5-chloro-3-indolyl] butyrate;
pentyl-α-[1-(3-thenoyl)-2-methyl-5-cyclopentyl-3-indolyl] valerate;
sec-butyl-α-[1-(1-methyl-indazole-3-carboxy)-2-methyl-5-(p-methylbenzylmercapto)-3-indolyl]caprylate;
methyl-α-[1-(oxazole-4-carboxyl)-2-methyl-5-methoxy-3-indolyl] propionate;
n-propyl-[1-(1-methylimidazol-5-carboxy)-2-methyl-5-trifluoromethyl-3-indolyl] acetate;
n-hexyl-[1-(2-benzylmercaptothiazole-4-carboxy)-2-methyl-5-methoxy-6-fluoro-3-indolyl] acetate;
2-methyl-butyl-α-[1-(N,N-dimethyl-p-sulfonamidobenzoyl)-2-methyl-5-cyclobutylmethoxy-3-indolyl]-α-t-butyl acetate.

The following non-limiting examples are illustrative of the process of the invention.

EXAMPLE 1

(1-p-chlorobenzoyl-2-methyl-5-methoxy-3-indolyl) acetic acid

Phthalimidomethyl - 1 - p-chlorobenzoyl - 2 - methyl-5-methoxy-3-indolyl acetate (0.004 mole) is dissolved in 20 ml. of toluene. The solution is saturated with anhydrous hydrochloric acid at 10° C. After 24 hours at room temperature, the solid is filtered off and purified by recrystallization from t-butanol to produce 1-p-chlorobenzoyl-2-methyl-5-methoxy-3-indolyl acetic acid.

EXAMPLE 2

(1-p-chlorobenzoyl-2-methyl-5-nitro-3-indolyl) acetic acid

A total of 0.008 mole of t-butyl 1-p-chlorobenzoyl-2-methyl-5-nitro-3-indolyl acid is dissolved in 25 ml. of anhydrous benzene. The solution is cooled to 10° C. and saturated with anhydrous hydrochloric acid. The reaction mixture is allowed to stand overnight at 20° C. The precipitate, the benzene hemi-solvate of 1-p-chlorobenzoyl-2-methyl-5-nitro-3-indolyl acetic acid, is filtered, washed with 5 ml. of cold benzene and dried in vacuo at 40° C., to produce the desired end product.

EXAMPLE 3

(1-p-chlorobenzoyl-2-methyl-5-fluoro-3-indolyl) acetic acid

A total of 0.01 mole of methyl-1-p-chlorobenzoyl-2-methyl-5-fluoro-3-indolyl acetate is dissolved in 15 ml. of 90% formic acid containing 0.01 mole of methanesulfonic acid. The solution is heated under reflux for five hours, cooled to room temperature and diluted with 30 ml. of water. The precipitated product is filtered, washed with water and recrystallized from t-butanol to produce 1-p-chlorobenzoyl-2-methyl-5-fluoro-3-indolyl acetic acid.

EXAMPLES 4–20

By hydrolyzing a compound of the formula

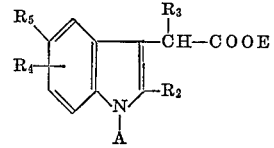

using the appropriate procedure of Examples 1 through 3, the corresponding free acid is obtained, when A, $R_2$, $R_3$, E, $R_4$, and $R_5$ are as defined as follows:

| Ex. | E | $R_2$ | $R_3$ | $R_4$ | $R_5$ | A | Solvent | Temp. (° C.) | Time (hrs.) | Alkane Sulfonic Acid |
|---|---|---|---|---|---|---|---|---|---|---|
| 4 | ethyl | ethyl | t-butyl | H | $CH_3O$ | benzoyl | 90% acetic | 118 | 4 | Methane. |
| 5 | t-butyl | cyclopropyl | methyl | F | $C_2H_5O$ | p-chlorobenzoyl | Benzene | 20 | 15 | |
| 6 | phthalimidomethyl | methyl | ethyl | H | $CH_3$ | 3,4,5-trimethoxybenzoyl | Toluene | 25 | 24 | |
| 7 | sec-butyl | H | sec-butyl | H | $CF_3$ | 5-nitro-2-furoyl | 90% formic | 101 | 5 | Ethane. |
| 8 | isopropyl | n-butyl | 2-methylpentyl | Cl | $C_6H_5CH_2O$ | p-acetylbenzoyl | 100% acetic | 118 | 6 | Methane. |
| 9 | phthalimidomethyl | phenyl | n-hexyl | H | F | p-carbomethoxybenzoyl | Benzene | 10 | 30 | |
| 10 | methyl | isopropyl | methyl | $CH_3$ | SH | p-mercaptobenzoyl | 100% formic | 101 | 4 | Do. |
| 11 | pentyl | 2-allyl | isopropyl | H | cyclopropyl | 2-phenylthiazole-4-carboxy | 95% acetic | 118 | 5 | Ethane. |
| 12 | triethylmethyl | benzyl | n-pentyl | H | $NO_2$ | p-carbomethoxybenzoyl | Toluene | 25 | 20 | |
| 13 | n-propyl | o-tolyl | n-propyl | $CH_3O$ | cyclopropylethoxy | p-methylsulfinylbenzoyl | 95% formic | 101 | 7 | Methane. |
| 14 | phthalimidomethyl | cyclobutyl | 2,2-dimethylbutyl | $CF_3$ | $C_6H_5CH_2S$ | 1-methylbenzimidazol-2-carboxy | Toluene | 20 | 16 | |
| 15 | hexyl | methyl | t-butyl | H | dimethylsulfonamido | 5-fluoro-2-thenoyl | 90% formic | 101 | 5 | Do. |
| 16 | methylethylisobutylmethyl | isobutyl | H | H | $C_2H_5$ | p-trifluoroacetylbenzoyl | Toluene | 15 | 24 | |
| 17 | t-butyl | p-tolyl | ethyl | H | $CH_3O$ | p-phenoxybenzoyl | Xylene | 25 | 20 | |
| 18 | isopropyl | n-propyl | sec-butyl | H | p-ethylbenzyloxy | p-N,N-dimethylsulfamylbenzoyl | 90% acetic | 118 | 5 | Ethane. |
| 19 | methyl | H | 2,3-dimethylbutyl | H | cyclobutyl | 1-methylbenzimidazol-2-carboxy | 100% acetic | 118 | 6 | Do. |
| 20 | phthalimidomethyl | n-pentyl | n-pentyl | $CH_3O$ | H | 3-furoyl | Xylene | 30 | 15 | |

Examples 4 through 20 illustrate the application of the processes of Examples 1, 2 and 3 to a variety of starting materials.

What we claim is:

1. A process for the acidolysis of lower alkyl and phthalimidomethyl esters of compounds of the formula

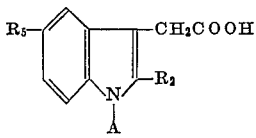

wherein A may be benzoyl, halobenzoyl or lower alkylthiobenzoyl; $R_2$ may be hydrogen or lower alkyl; and $R_5$ may be lower alkoxy or halo; which comprises reacting a reagent selected from the group consisting of a lower alkanesulfonic acid in the presence of a lower alkanoic acid, and anhydrous hydrogen chloride, to produce the corresponding indole acid.

2. A process for the acidolysis of primary and secondary lower alkyl esters of compounds of the formula

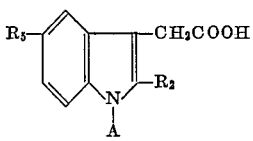

wherein A may be benzoyl, halobenzoyl or lower alkylthiobenzoyl; $R_2$ may be hydrogen or lower alkyl; and $R_5$ may be lower alkoxy or halo; which comprises reacting the selected ester with a lower alkanesulfonic acid and a lower alkanoic acid to produce the corresponding indole acid.

3. A process for the acidolysis of tertiary lower alkyl and phthalimidomethyl esters of compounds of the formula

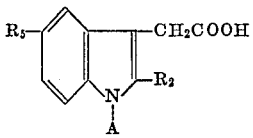

wherein A may be benzoyl, halobenzoyl or lower alkylthiobenzoyl; $R_2$ may be hydrogen or lower alkyl; and $R_5$ may be lower alkoxy or halo; which comprises reacting the selected ester with anhydrous hydrogen chloride to produce the corresponding indole acid.

4. A process for the acidolysis of primary and secondary lower alkyl esters of compounds of the formula

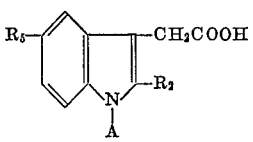

wherein A may be benzoyl, halobenzoyl or lower alkylthiobenzoyl; $R_2$ may be hydrogen or lower alkyl; and $R_5$ may be lower alkoxy or halo; which comprises reacting the selected ester with methanesulfonic acid and formic acid to produce the corresponding indole acid.

5. A process for the acidolysis of primary and secondary lower alkyl esters of compounds of the formula

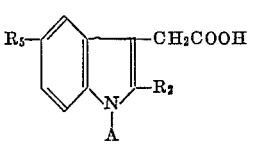

wherein A may be benzoyl, halobenzoyl or lower alkylthiobenzoyl; $R_2$ may be hydrogen or lower alkyl; and $R_5$ may be lower alkoxy or halo; which comprises reacting the selected ester with methanesulfonic acid and acetic acid to produce the corresponding indole acid.

6. A process for the acidolysis of tertiary lower alkyl and phthalimidomethyl esters of compounds of the formula

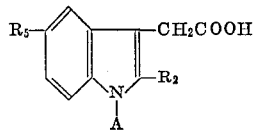

wherein A may be benzoyl, halobenzoyl or lower alkylthiobenzoyl; $R_2$ may be hydrogen or lower alkyl; and $R_5$ may be lower alkoxy or halo; which comprises reacting the selected ester with anhydrous hydrogen chloride to produce the corresponding indole acid.

7. A process for the acidolysis of primary and secondary lower alkyl esters of compounds of the formula

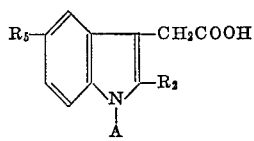

wherein A may be benzoyl, halobenzoyl or lower alkylthiobenzoyl; $R_2$ may be hydrogen or lower alkyl; and $R_5$ may be lower alkoxy or halo; which comprises reacting the selected ester with methanesulfonic acid and formic acid at a temperature between about 90° C. and 130° C. for about two hours to about eight hours to produce the corresponding indole acid.

8. A process for the acidolysis of tertiary lower alkyl and phthalimidomethyl esters of compounds of the formula

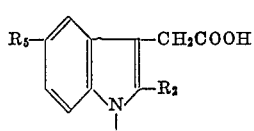

wherein A may be benzoyl, halobenzoyl or lower alkylthiobenzoyl; $R_2$ may be hydrogen or lower alkyl; and $R_5$ may be lower alkoxy or halo; which comprises reacting the selected ester, in a reaction inert solvent selected from the group consisting of benzene, toluene and xylene, with anhydrous hydrogen chloride, at a temperature from about 0° C. to about 30° C. for about 15 hours to about 30 hours, to produce the corresponding indole acid.

9. A process for the acidolysis of the methyl ester of a compound selected from the group consisting of compounds of the formula

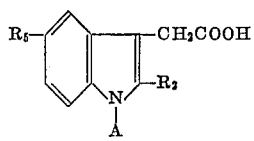

wherein A may be benzoyl, halobenzoyl or lower alkylthiobenzoyl; $R_2$ may be hydrogen or lower alkyl; and $R_5$ may be lower alkoxy or halo; which comprises reacting the methyl ester with methanesulfonic acid and formic acid at about 100° C. for about five hours to produce the corresponding indole acid.

10. A process for the acidolysis of the phthalimidomethyl ester of a compound selected from the group consisting of compounds of the formula

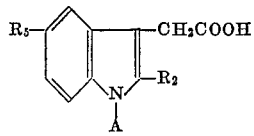

wherein A may be benzoyl, halobenzoyl or lower alkylthiobenzoyl; $R_2$ may be hydrogen or lower alkyl; and $R_5$ may be lower alkoxy or halo; which comprises reacting the phthalimidomethyl ester, dissolved in benzene, with anhydrous hydrogen chloride, at a temperature from about 10° C. to about 25° C. for about 24 hours, to produce the corresponding indole acid.

References Cited

Loev, Chemistry & Industry, February 1964, pages 193–194.

Migrdichian, Organic Synthesis, vol. 1, Reinhold Publishing Corp., New York, 1957, pp. 336–337.

ALEX MAZEL, *Primary Examiner.*

J. A. NARCAVAGE, *Assistant Examiner.*

U.S. Cl. X.R.

260—326.13, 326.14, 326, 999